(12) United States Patent
Meng et al.

(10) Patent No.: US 11,496,783 B2
(45) Date of Patent: Nov. 8, 2022

(54) METHOD AND SYSTEM FOR PLAYING DIGITAL VIDEOS ON USER DEVICES

(71) Applicant: Doumob Inc., Beijing (CN)

(72) Inventors: Dawei Meng, Beijing (CN); Bin Yang, Beijing (CN)

(73) Assignee: Doumob Inc., Beijing (CN)

( * ) Notice: Subject to any disclaimer, the term of this patent is extended or adjusted under 35 U.S.C. 154(b) by 0 days.

(21) Appl. No.: 16/920,709

(22) Filed: Jul. 5, 2020

(65) Prior Publication Data
US 2021/0058656 A1 Feb. 25, 2021

(51) Int. Cl.
| | |
|---|---|
| *H04N 21/238* | (2011.01) |
| *H04N 21/2383* | (2011.01) |
| *H04N 21/2387* | (2011.01) |
| *H04N 21/24* | (2011.01) |
| *H04N 21/426* | (2011.01) |
| *H04N 21/454* | (2011.01) |
| *H04N 21/4782* | (2011.01) |
| *H04N 21/258* | (2011.01) |

(Continued)

(52) U.S. Cl.
CPC ... *H04N 21/23805* (2013.01); *H04N 21/2383* (2013.01); *H04N 21/2387* (2013.01); *H04N 21/2407* (2013.01); *H04N 21/2408* (2013.01); *H04N 21/25825* (2013.01); *H04N 21/42684* (2013.01); *H04N 21/4316* (2013.01); *H04N 21/454* (2013.01); *H04N 21/4782* (2013.01); *H04N 21/812* (2013.01); *H04N 21/854* (2013.01)

(58) Field of Classification Search
CPC ......... H04N 21/23805; H04N 21/2384; H04N 21/2387; H04N 21/2407; H04N 21/2408; H04N 21/25825; H04N 21/42684; H04N 21/4316; H04N 21/454; H04N 21/4782; H04N 21/812; H04N 21/854
See application file for complete search history.

(56) References Cited

U.S. PATENT DOCUMENTS

| | | | |
|---|---|---|---|
| 10,305,911 B1 * | 5/2019 | Eyre | H04L 63/101 |
| 2009/0055534 A1 * | 2/2009 | Sadja | H04N 21/235 709/226 |

(Continued)

*Primary Examiner* — Jefferey F Harold
*Assistant Examiner* — Franklin S Andramuno

(57) ABSTRACT

This patent disclosure provides various embodiments of a client-server based digital video playback system and technique. In one aspect, a process for playing internet/online videos on a user device is disclosed. This process can begin by sending a video playback request for playing an online video to the server, wherein the video playback request includes a device type and a browser type of the user device. Next, the process receives a set of video playback addresses and a set of video playback configuration files from the server, wherein the set of video playback addresses and the set of video playback configuration files are generated based on the device type and the browser type. The process subsequently selects a video playback address from the set of video playback addresses corresponding to a transcoded version of the online video that matches a device version and a browser version of the user device. The process next obtains the transcoded version of the online video from the selected video playback address, and plays the obtained video on the user device.

18 Claims, 8 Drawing Sheets

(51) Int. Cl.
  *H04N 21/431* (2011.01)
  *H04N 21/81* (2011.01)
  *H04N 21/854* (2011.01)

(56) References Cited

U.S. PATENT DOCUMENTS

| | | | |
|---|---|---|---|
| 2014/0122570 A1* | 5/2014 | Narvaez | H04L 65/1069 709/203 |
| 2015/0020135 A1* | 1/2015 | Frusina | H04N 21/2405 725/116 |
| 2017/0238067 A1* | 8/2017 | Sharma | H04N 21/4331 725/14 |
| 2017/0354878 A1* | 12/2017 | Posin | A63F 13/355 |
| 2021/0120292 A1* | 4/2021 | Liu | H04N 21/2401 |

* cited by examiner

METHOD AND SYSTEM FOR PLAYING DIGITAL VIDEOS ON USER DEVICES

PRIORITY CLAIM AND RELATED PATENT APPLICATIONS

This patent application claims priority under 35 U.S.C. § 119 to Chinese Patent Application No. 201910772452.4 entitled "Video Playing Method, Player, Server and System" filed on 20 Aug. 2019. The content of the above-listed application is incorporated herein by reference as a part of this patent document.

TECHNICAL FIELD

The present disclosure generally relates to digital video technology and, more specifically, to systems, devices and techniques for improving video playback compatibilities, qualities, and experiences when playing back a given internet video in different browsers.

BACKGROUND

Video advertising based on Hyper Text Markup Language version 5 (or HTML5) is believed to eventually become the dominant format in the next generation of interactive advertising. To reach a great number of users, video advertisements (ads) need to be played on a large number of user devices of various models, and in web browsers of various types and versions. Hence, video ads publishers need to overcome the technical challenges of supporting different video playback platforms.

In conventional digital video techniques, video playbacks in a given web browser are controlled by the browser's native video tags. In such techniques, because the browser needs to read the associated video tag before playing a given video, the qualities of the online video playbacks can be severely limited by the browser configurations. More specifically, different browsers are often configured to put various restrictions on these video tags, such as not allowing an autoplay feature, preventing pop-ups, or requiring special configurations by the client to enable inline playbacks, etc. As a result, the playback experiences of the same video in different browsers and/or on different user devices can be significantly different. Consequently, using conventional video playback techniques to play a video advertisement (ad) on different devices and/or browsers can result in vastly different experiences, thereby hindering the effectiveness of the video ad.

SUMMARY

This patent disclosure provides various embodiments of a client-server based digital video playback system and technique. More specifically, a disclosed client-server system can include a client device communicably coupled to a server through a network. The client device can include at least a display, a web browser for displaying a web page, and a video player within the browser configured to play back digital videos including video advertisements within the browser. In various embodiments, the client device can include but is not limited to: a computing device such as a laptop or a desktop computer, a smartphone or cell phone, a tablet computer, a PDA, a portable media player, and a connected/smart television.

In one aspect, a client process for playing internet/online videos on a user device is disclosed. This process can begin by sending a video playback request for playing an online video to the server, wherein the video playback request includes at least a device type and a browser type of the user device. Next, the process receives a set of video playback addresses and a set of video playback configuration files from the server, wherein the set of video playback addresses and the set of video playback configuration files are generated based at least on the device type and the browser type. The process subsequently selects a video playback address from the set of video playback addresses corresponding to a transcoded version of the online video that matches a device version and a browser version of the user device. The process next obtains the transcoded version of the online video from the selected video playback address, and begins to play the obtained video on the user device using a corresponding video playback configuration file in the set of video playback configuration.

In some embodiments, each video playback address in the set of video playback addresses corresponds to a respective configuration file in the set of video playback configuration files.

In some embodiments, the video playback request further includes network status information, and the set of video playback addresses and the set of video playback configuration files can be generated based on the network status information, the device type and the browser type.

In some embodiments, the client process selects the video playback address from the set of video playback addresses by: if the user device supports WebAssembly, selecting a video playback address in the set of video playback addresses corresponding to a first transcoded version of the online video which was transcoded based on a H.264 encoding format; and if the user device does not support WebAssembly, selecting a video playback address in the set of video playback addresses corresponding to a second transcoded version of the online video which was transcoded based on a MPEG-1 encoding format.

In some embodiments, the client process further includes receiving a blacklist from the server, wherein the blacklist includes a second set of video playback addresses that do not support the device type and browser type. The client process would then reject the selected video playback address if the selected video playback address is in the received blacklist.

In some embodiments, during the online video playback, the client process sends playback quality information to the server. The client process subsequently receives from the server, an updated set of video playback addresses and corresponding configuration files generated based on the playback quality information, the device type, and the browser type.

In another aspect, a server process for facilitating internet/online video playbacks on a user device is disclosed. The process may begin by receiving a video playback request for an online video, such as an interactive video ad, from the user device, wherein the video playback request includes at least a device type and a browser type of the user device. The process then generates a set of video playback addresses and a corresponding set of video playback configuration files of the requested video based at least on the device type and browser type. The process subsequently sends the set of video playback addresses and the corresponding playback configuration files back to the user device to facilitate playing the requested video on the user device.

In some embodiments, the video playback request further includes network status information, and the set of video playback addresses and the set of video playback configuration files are generated based on the network status information, the device type, and the browser type.

In some embodiments, the server process further includes the steps of: generating a blacklist of video playback addresses that do not support the received device type and/or the browser type; and sending the blacklist of video playback addresses back to the user device.

In some embodiments, the server process further includes the steps of: receiving video playback quality information from the user device during an online video playback; updating the set of generated video playback addresses and the corresponding configuration files based on the received playback quality information; and sending the updated set of video playback addresses and the corresponding configuration files back to the user device.

In some embodiments, the server process further includes receiving an uploaded video from an owner of the uploaded video, such as a video advertisement (ad) form a requestor. The process then transcodes the uploaded video with multiple encoding schemes and resolutions to generate a set of transcoded videos of the uploaded video. Next, for each video in the set of transcoded videos of the uploaded video, the process generates a corresponding video playback address for the transcoded video to specify the storage location of the transcoded video.

In some embodiments, the server process transcodes the uploaded video with multiple encoding schemes and resolutions by: (1) transcoding the uploaded video into a first set of encoded videos corresponding to the multiple encoding schemes; and (2) transcoding each encoded video in the first set of encoded videos into a second set of videos corresponding to multiple video resolutions.

In some embodiments, the multiple encoding schemes include: MPEG-1, MPEG-4, H.264, and WebM.

In yet another aspect, a client device for playing internet/online videos is disclosed. The client device includes: one or more processors; a web browser; a sending module for sending a video playback request for playing back an online video to a server, wherein the video playback request includes at least a device type of the client device and a browser type of the web browser; a receiving module for receiving a set of video playback addresses and a set of video playback configuration files from the server, wherein the set of video playback addresses and the set of video playback configuration files are generated based at least on the device type and the browser type; a selection module for selecting a video playback address from the set of video playback addresses corresponding to a transcoded version of the online video that matches a device version and a browser version of the user device; an acquisition module for obtaining the transcoded version of the online video from the selected video playback address; and a playback module for playing back the obtained video on the user device using a corresponding video playback configuration file in the set of video playback configuration files.

In some embodiments, the receiving module is further configured to receive a blacklist from the server, wherein the blacklist includes a second set of video playback addresses that do not support the device type and browser type, and the selection module is further configured to reject the selected video playback address if the selected video playback address is in the received blacklist.

In some embodiments, the sending module is further configured to send playback quality information to the server during the online video playback, and the receiving module is further configured to receive from the server, an updated set of video playback addresses and corresponding configuration files generated based on the playback quality information, the device type, and the browser.

In yet another aspect, a server for facilitating internet/online video playbacks on a user device is disclosed. The server can include: one or more processors; a storage device coupled to the one or more processors; a receiving module for receiving a video playback request from a user device for an online video, wherein the video playback request includes at least a device type and a browser type of the user device; a processing module for generating a set of video playback addresses and a corresponding set of video playback configuration files of the requested video based at least on the device type and browser type; and a sending module for sending the set of video playback addresses and the corresponding playback configuration files back to the user device to facilitate playing the requested video on the user device.

In some embodiments, the processing module is further configured to generate a blacklist of video playback addresses that do not support the received device type and/or the browser type; and the sending module is further configured to send the blacklist of video playback addresses back to the user device.

In some embodiments, the receiving module is further configured to receive video playback quality information from the user device during an online video playback. Next, the processing module is further configured to update the set of generated video playback addresses and the corresponding configuration files based on the received playback quality information. Moreover, the sending module is further configured to send the updated set of video playback addresses and the corresponding configuration files back to the user device.

In some embodiments, the receiving module is further configured to receive an uploaded video from an owner of the uploaded video. The processing module is further configured to: transcode the uploaded video with multiple encoding schemes and resolutions to generate a set of encoded videos of the uploaded video; and for each video in the set of transcoded videos of the uploaded video, generate a corresponding video playback address for the transcoded video to specify the storage location of the transcoded video.

BRIEF DESCRIPTION OF THE DRAWINGS

The structure and operation of the present disclosure will be understood from a review of the following detailed description and the accompanying drawings in which like reference numerals refer to like parts and in which.

DETAILED DESCRIPTION

Figure 1:
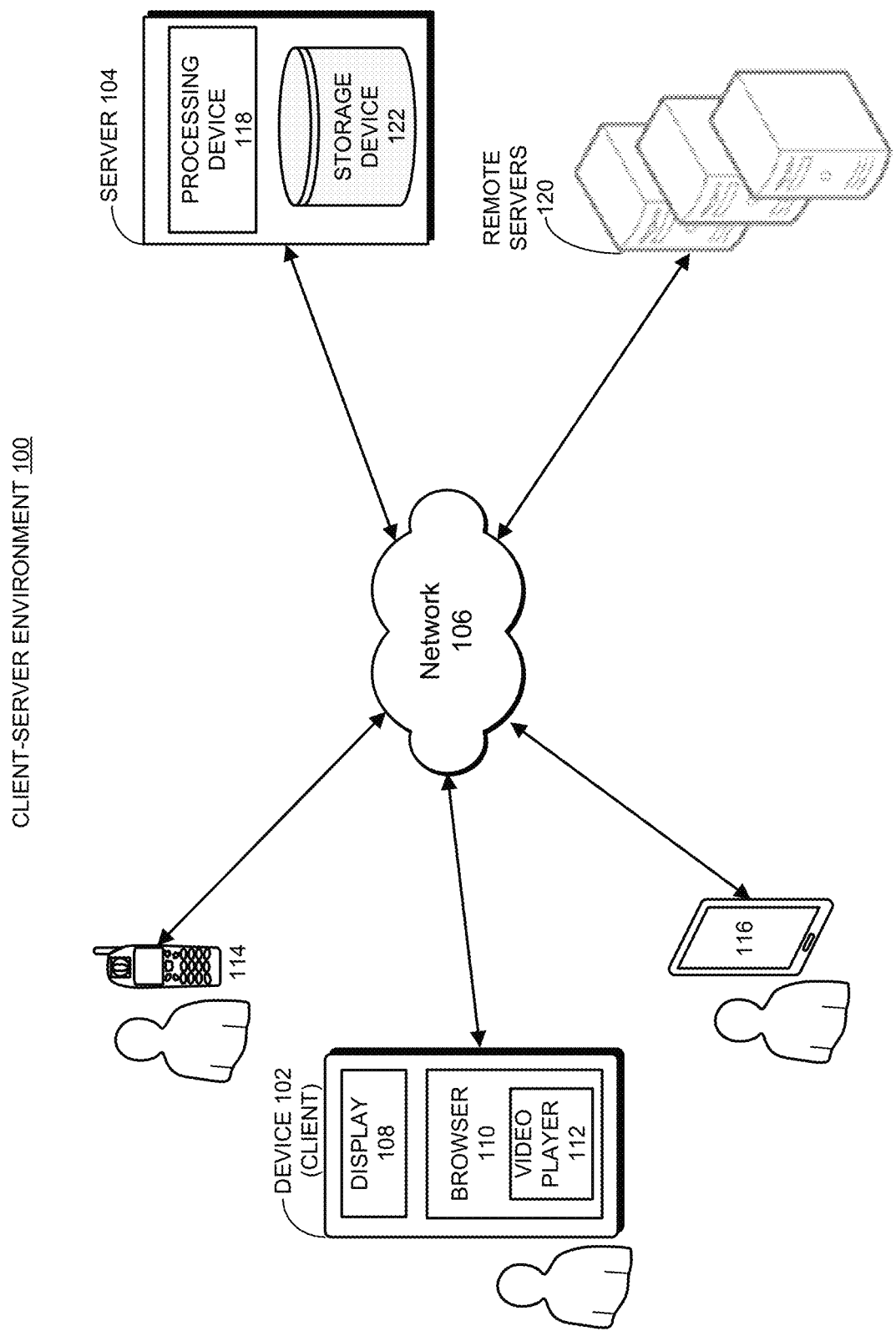
FIG. 1 illustrates an example client-server environment which provides the disclosed video playback platform in accordance with some embodiments described herein.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

This patent disclosure provides various embodiments of a client-server based video playback system and technique. More specifically, a disclosed client-server system can include a client device communicably coupled to a server through a network. The client device can include at least a display, a web browser for displaying a web page, and a video player within the browser configured to play back internet/online videos including video advertisements (ads) within the browser.

In a particular embodiment, a client process for playing internet/online videos on a user device is disclosed. This process can begin by sending a video playback request for playing back an online video to the server, wherein the video playback request includes at least a device type and a browser type of the user device. Next, the process receives a set of video playback addresses and a set of video playback configuration files from the server, wherein the set of video playback addresses and the set of video playback configuration files are generated based at least on the device type and the browser type. The process subsequently selects a video playback address from the set of video playback addresses corresponding to a transcoded version of the online video that matches a device version and a browser version of the user device. The process next obtains the transcoded version of the online video from the selected video playback address, and begins to play the obtained video on the user device using a corresponding video playback configuration file in the set of video playback configuration files.

In another embodiment, a server process for facilitating internet/online video playbacks on a user device is disclosed. The process may begin by receiving a video playback request from the user device for an online video, such as a video advertisement, wherein the video playback request includes at least a device type and a browser type of the user device. The process then generates a set of video playback addresses and a corresponding set of video playback configuration files of the requested video based at least on the device type and browser type. The process subsequently sends the set of video playback addresses and the corresponding playback configuration files back to the user device to facilitate playing the requested video on the user device.

In some embodiments, the disclosed video playback techniques can automatically determine an optimal video playback address of a requested video for the current user device based at least on the device type and the browser type of the user device, thereby improving the compatibility of the requested video in different devices and different browsers, improving video playback efficiency and/or quality, and enhancing the viewer's video playback experiences. The disclosed video playback techniques can also reduce dependencies on web browser's native video tags during video playbacks. Using the disclosed video playback techniques, it is possible to bypass the web browser's restrictions on interactive video ads, which provides the foundation and passage for making various new video advertising attempts. Moreover, the disclosed video playback techniques can significantly enhance video playback compatibilities on various user devices of different software and hardware configurations, and therefore optimize playback experiences.

FIG. 1 illustrates an example client-server environment 100 which provides the disclosed video playback platform in accordance with some embodiments described herein. Client-server environment 100 includes a client, i.e., an end-user device 102 (or simply "user device 102" or "device 102" hereinafter) communicably coupled to a server 104 through a network 106. Client-server environment 100 can additionally include one or more remote servers 120 communicably coupled to server 104 and end-user device 102 through network 106.

Note that end-user device 102 is an electronic device that includes a video playback function. In some embodiments, end-user device 102 can include, but is not limited to a computing device such as a laptop or a desktop computer, a smartphone/cell phone, a tablet computer, a PDA, a portable media player, and a connected/smart television. As can be seen, user device 102 includes at least a display 108, and a web browser application 110 (also referred to as "web browser 110" or simply "browser 110" hereinafter) for displaying a web page or a web application within display 108. Web browser 110 can include one of: Mozilla Firefox®, Google Chrome®, Microsoft Internet Explorer®, Microsoft Edge®, Apple Safari®, Opera®, Vivaldi®, and other types of web browsers now known and later developed. Although user device 102 is shown to have one web browser 110, user device 102 can include additional browsers of other types. For example, an Android® mobile device can typically include a native Android browser such as WebView® or a Chrome® browser.

Note that browser 110 of end-user device 102 can further include a video player 112 configured to play back internet/online videos including online video advertisements within browser 110. In some embodiments, video player 112 is communicably coupled to server 104 and one or more remote servers 120 through web browser 110 and network 106. However, video player 112 can also be communicably coupled to server 104 and one or more remote servers 120 through a separate user agent on device 102 and network 106. In some embodiments, video player 112 is configured to implement the various disclosed video playback techniques. Although video player 112 is shown in FIG. 1 as a part of browser 110, other embodiments can have video player 112 separated from browser 110 but communicably coupled to browser 110. Although not shown, user device 102 also includes one or more processors for executing web browser 110 to enable displaying a web page or a web application within display 108, and for executing video player 112 to enable playing internet/online videos including online video advertisements within browser 110. Note that client-server environment 100 can include additional end-user devices/clients such as a smartphone 114 and a tablet computer 116, which are both communicably coupled to server 104 through network 106.

As can be seen in FIG. 1, server 104 includes a processing device 118 and a storage device 122. Processing device 118 executes computer instructions stored in storage device 122, for example, to generate video playback addresses and corresponding configuration files in response to a video playback request from end-user device 102, to update video playback addresses and corresponding configuration files in response to playback quality information from end-user device 102; and to transcode a newly uploaded video into a set of transcoded versions of the uploaded video in multiple encoding schemes and resolutions, and generate corresponding video playback addresses for the set of transcoded video versions.

In some example aspects, server 104 can be a single computing device such as a computer server. In other embodiments, server 104 can represent more than one computing device working together to perform the actions of a server computer (e.g., cloud computing). The server 104 may host a web server communicably coupled to browser 110 at user device 102 via network 106 to process web requests from browser 110 and video player 112. Server 104 may further be in communication with one or more remote servers 120 either through network 106 or through another network or communication means.

The one or more remote servers 120 may perform various functionalities and/or storage capabilities described herein with regard to server 104 either alone or in combination with server 104. Each of the one or more remote servers 120 may host various services. For example, remote servers 120 may host services of providing video sources associated with the video playback addresses or update video playback addresses generated by server 104 in response to video playback requests or playback quality information from end-user device 102. Remote servers 120 may also store different versions of a requested video at different storage locations specified by a set of video playback addresses.

Server 104 may further maintain or be in communication with social networking services hosted on one or more remote servers 120. These social networking services may provide various services and may enable users to create user profiles and associate themselves with other users within a social network. Server 104 and/or the one or more remote servers 120 may further facilitate the generation and maintenance of a social graph including the user created associations. These social graphs can include, for example, a list of all users of the social network and their associations with other users of the social network.

Each of the one or more remote servers 120 can be a single computing device such as a computer server or can represent more than one computing device working together to perform the actions of a server computer (e.g., cloud computing). In one embodiment, server 104 and one or more remote servers 120 can be implemented as a single server or across multiple servers. In some embodiments, server 104 and one or more remote servers 120 can communicate through browser 110 on user device 102 via network 106.

The user of end-user device 102 can interact with one or more services hosted by server 104, and/or one or more services hosted by remote servers 120, through a client application installed on user device 102. Alternatively, the user of end-user device 102 can interact with one or more services hosted by server 104, and/or one or more services hosted by remote servers 120 through browser 110 of user device 102.

Communications between user device 102, server 104, and/or one or more remote servers 120 can be facilitated through various communication protocols. In some embodiments, user device 102, server 104 and/or one or more remote servers 120 may communicate wirelessly through a communication interface (not shown), which may include digital signal processing circuitry where necessary. The communication interface may provide for communications under various modes or protocols, including Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including using a Bluetooth, WiFi, or other such transceiver.

Network 106 can include, for example, any one or more of a personal area network (PAN), a local area network (LAN), a campus area network (CAN), a metropolitan area network (MAN), a wide area network (WAN), a broadband network (BBN), the Internet, and the like. Furthermore, network 106 can include, but is not limited to, any one or more of the following network topologies, including a bus network, a star network, a ring network, a mesh network, a star-bus network, tree or hierarchical network, and the like.

Figure 2:
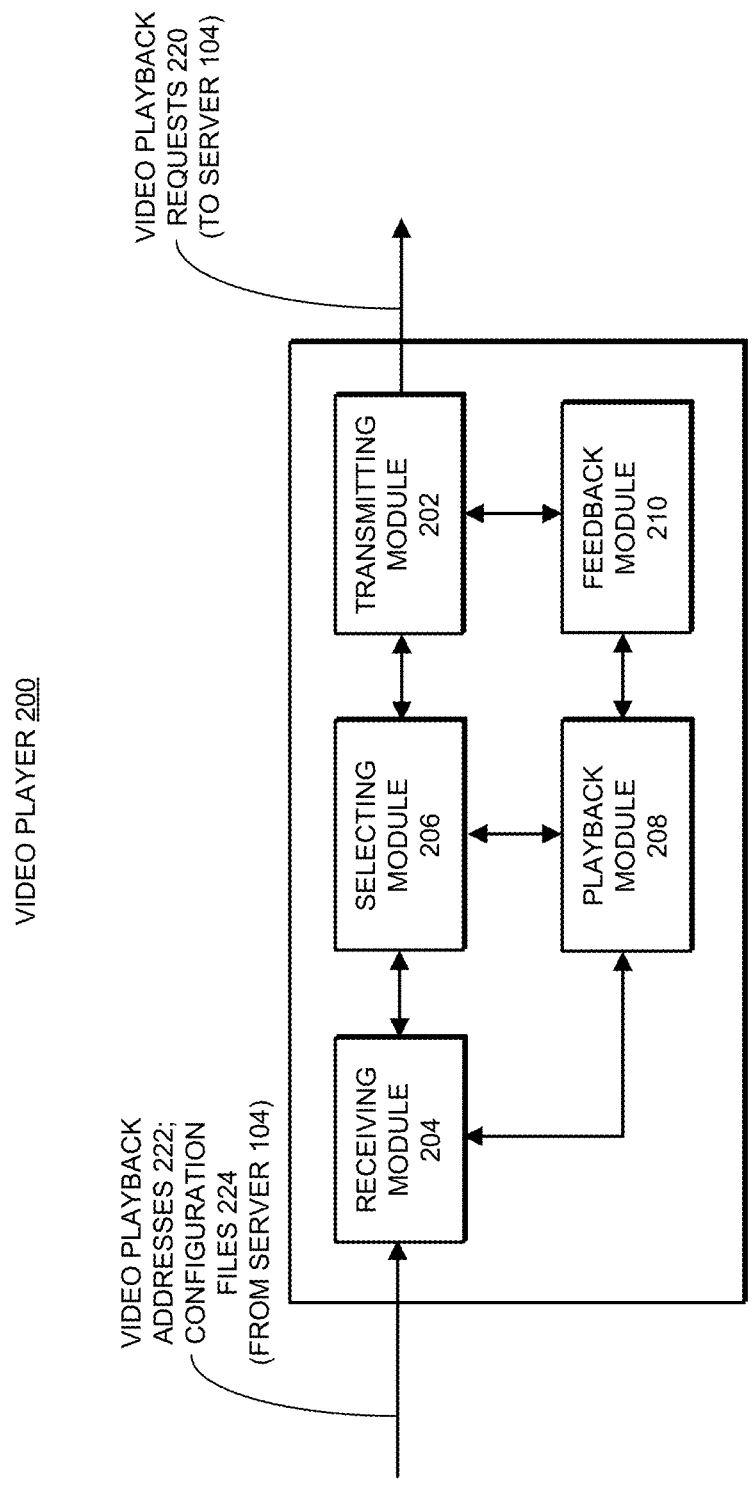
FIG. 2 shows a block diagram of a video player which is an exemplary implementation of the video player within the web browser described in conjunction with FIG. 1 in accordance with some embodiments described herein.

FIG. 2 shows a block diagram of a video player 200 which is an exemplary implementation of video player 112 within browser 110 of user device 102 described in conjunction with FIG. 1 in accordance with some embodiments described herein. As shown in FIG. 2, video player 200 includes at least a transmitting module 202, a receiving module 204, a selection module 206 coupled to both transmitting module 202 and receiving module 204, and a playback module 208 coupled to selection module 206. Video player 200 can also include a feedback module 210 coupled to both transmitting module 202 and playback module 209, In some embodiments, video player 200 is configured to support playing videos of HTML5 standard.

In some embodiments, transmitting module 202 of video player 200 is configured to send video playback requests 220 to server 104, wherein a given video playback request 220 is configured to request an online video (also referred to as the "requested video" hereinafter), such as an online video advertisement, from server 104 to be played in web browser 110. More specifically, a given video playback request 220 can include a device type of user device 102 and a browser type of web browser 110. For example, the device type specified in a given video playback request 220 can include some or all of the following device information: the device brand, the model of the device brand, the version of the device model, and the operating system (OS) type (e.g., Android®, iOS®, or Windows®) and version, among others. For example, mobile phones of brand "A" can include various models such as "X1," "X2," "X3," etc. Furthermore, for mobile phones of the same brand and model, such as brand "A" and model "X2," there can be multiple versions, such as "V1.1," "V2.4," etc. Furthermore, for mobile phones of the same brand, model, and version, such as brand "A," model "X2," and version "V1.1," they can support multiple mobile system software versions.

In some embodiments, the browser type in a given video playback request 220 includes the brand of web browser 110 and the version of the browser brand. Note that browsers of the same browser type can also have various versions as a result of version upgrades. For example, browser brand Internet Explorer and corresponding browser model IE11® further includes multiple versions such as IE11.1®, IE11.2, among others.

In some embodiments, a video playback request 220 can also include network status information of the local area network user device 102 is connected to. For example, this network status information can include the type of local area network user device 102 is connected to, which can include but are not limited to: a 3G network, a 4G network, a 5G network, a wired local area network, a wireless network, and so on. The network status information may also include the transmission status of the local area network, including but are not limited to: the highest data transmission rate, an average transmission rate, and a median transmission rate of the local area network within which user device 102 is located.

In some embodiments, after receiving a video playback request 220 for an online video including network status information indicating that the network transmission status is good, server 104 can provide user device 102 with video options of the requested video of higher qualities such as higher-resolutions, thereby improving the user's video playback experience. However, if after receiving a video playback request 220 including network status information indicating that the network transmission status is poor, server 104 can provide user device 102 with video options of the requested video of lower qualities such as lower-resolutions which have lower requirements for network transmission bandwidth, thereby reducing network transmission pressure and making video playback on user device 102 smoother. Note that by providing lower-resolution video options to user device 102, playback events such as freeze and stagnation during the video playback process that can negatively affect the user's viewing experience can be avoided.

In some embodiments, when user device 102 includes more than one browser, transmitting module 202 can send a single video playback request 220 that includes multiple browser types for each of the multiple browsers. Alternatively, transmitting module 202 may send a video playback request 220 to specify just one browser type among the multiple browsers installed on user device 102. As an example, transmitting module 202 may separately send multiple video playback requests 220 to server 104 over a time period. Specifically, transmitting module 202 may begin to send a first video playback request 220 which includes: a device type that comprises a device model and a first OS version of user device 102, and a first browser type for the first browser installed on user device 102. Next, transmitting module 202 sends a second video playback request 220 which includes the same device type but a second browser type for the second browser installed on user device 102. Transmitting module 202 subsequently sends a third video playback request 220 which includes: an updated device type that comprises the same device model but a second OS version of user device 102, and the second browser type. In other words, during a time interval between the second and the third video playback requests, the OS of user device 102 was upgraded from the first version to the second version. As will be described further below, during a video playback, transmitting module 202 can send additional video playback requests 220 to server 104 to also include real-time video playback quality information, in addition to the device type and current browser model and version information.

In some embodiments, receiving module 204 of video player 200 is configured to receive a set of video playback addresses 222 and a corresponding set of video playback configuration files 224 from server 104 in response to a given video playback request 220. Note that the set of video playback addresses 222 specifies a set of storage locations storing a set of transcoded video files of the requested video within a storage device (e.g., storage device 122 within server 104), wherein a different transcoded video file in the set of transcoded video files (e.g., of a unique encoding scheme and/or video resolution/quality) is stored at a different storage location in the set of storage locations.

As will be discussed in more detail below, the set of video playback addresses 222 and the corresponding configuration files 224 can be generated by server 104 based on a received video playback request 220 including the device type and the browser type of user device 102. In some other embodiments, the set of video playback addresses 222 and the corresponding playback configuration files 224 are generated by server 104 based on network status information, the device type and the browser type of user device 102. Moreover, the video playback configuration files 224 may include a recommended playback order for the set of video playback addresses 222 generated by server 104, and each order number in the recommended playback order corresponds to a respective video address in the set of video playback addresses 222.

Note that each returned video playback address in the set of video playback addresses 222 specifies the storage location of a single video file. Therefore, the set of video playback addresses 222 specify the storage locations of multiple video files which are the different transcoded versions of the same request video. In some embodiments, the set of video playback addresses corresponds to a set of video files of the same requested video which has been transcoded into multiple different encoding formats including but are not limited to MPEG-1, MPEG-4, H.264, WebM, and Ogg.

In some other embodiments, the set of video playback addresses 222 corresponds to a set of video files of the same requested video which has been transcoded into multiple different video qualities/resolutions including but are not limited to 360p, 480p, 720p, 1080p, 1440p and 4K. In yet other embodiments, the set of video playback addresses 222 corresponds to a set of video files of the same requested video which has been transcoded into different combinations of the above-described encoding formats and video qualities/resolutions. In other words, the requested video has been transcoded into multiple different encoding formats, and for each of the encoding formats, there are multiple video files corresponding to the multiple video resolutions. For example, the set of video received playback addresses 222 can correspond to four video files V1-V4 of the same requested video: (1) V1 is an MPEG-1 file at 480p; (1) V2 is an MPEG-1 file at 1080p; (3) V3 is an H.264 file at 480p; and (4) V4 is an H.264 file at 1080p.

In some embodiments, selection module 206 of video player 200 is configured to select a video playback address from the set of received video playback addresses 222 which matches the device version of user device 102 and the browser version of browser 110. In some embodiments, selection module 206 is also configured to obtain a target video file from server 104 or from remote servers 120 based on the selected video playback address. For example, selection module 206 may use transmitting module 202 to send the selected video playback address to server 104, and subsequently use receiving module 204 to receive the target video file returned from server 104 in response to the selected video playback address. As mentioned above, this obtained target video file is a particular transcoded version of the requested video, which can have a unique combination of encoding format and video resolution.

In some embodiments, selection module 206 of video player 200 is further configured to select a video playback configuration file in the set of received video playback configuration files 224 based on the device type of user device 102 and the browser version of browser 110. In some embodiments, playback module 208 of video player 200 is configured to receive the target video file from selection module 206 or directly from receiving module 204, and additionally receive the selected video playback configuration file from selection module 206. Playback module 208 is further configured to play back the received target video file within browser 110 of user device 102 using the selected video playback configuration file.

In some embodiments, selection module 206 is further configured to determine if user device 102 supports WebAssembly. If so, selection module 206 is configured to select a video playback address in the set of video playback addresses 222 corresponding to a video version that is based on H.264 encoding format, which typically has higher playback qualities. However, if it is determined that user device 102 does not support WebAssembly, selection module 206 is further configured to select a video playback address in the set of video playback addresses 222 corresponding to a video file that is based on MPEG-1 encoding format, which typically has higher playback qualities.

Note that even if a target video can be selected by selection module 206 based on the device model and version, and browser type and version of the user device, various playback issues, such as video stuttering, glitching, freezing, skipping, lagging, error reporting, etc. can still occur during the target video playback process. One solution is to send real-time playback quality information back to server 104. For example, video player 200 can use feedback module 210 coupled to playback module 208 to collect video playback quality information during the playback of the selected video file, and send the real-time video playback quality information to server 104 through transmitting module 202. In particular, this real-time video playback quality information can include any detected playback anomaly, such as video stuttering, glitching, skipping, lagging, and error reporting. In some embodiments, feedback module 210 can combine the real-time video playback quality information with the device type and browser type to generate a new video playback request 220, and subsequently send the real-time video playback quality information to server 104 by way of a new video playback request 220 for the same requested video.

After receiving the real-time video playback quality information from user device 102, server 104 can be configured to analyze the received playback information and determine the reason for each detected playback anomaly. If such playback anomaly is detected, server 104 can then determine an alternative video playback address based on the determined reason for the detected playback anomaly which would improve the video playback quality. Server 104 subsequently sends the alternative video playback address and the corresponding configuration information to user device 102. In some embodiments, after receiving the alternative video playback address from server 104 through receiving module 204, playback module 208 is configured to stop playing the current target video file and begin playing a new video file corresponding to the alternative video playback address.

Note that the above-described solution to fix the real-time playback issues require interactions and data changes between user device 102 and server 104, which can be subject to delays, for example, due to congestions on network 106 or response speed of server 104. Hence, another solution to the above-described real-time playback issues is to resolve the playback issues locally in real-time on user device 102.

More specifically, we described above that server 104 generally returns the set of video playback addresses 222 based on the device type and browser type specified in the received video playback request 220. To allow user device 102 to resolve the playback issues locally in real-time, in some embodiments, server 104 can be configured to generate and return a larger/broader set of playback addresses corresponding to a larger/broader set of the transcoded video files of the requested video that meets at least some partial requirements of the received device type and browser type. For example, server 104 can return all playback addresses of those transcoded video files that meet at least one of the device type requirement and the browser type requirement, instead of meeting both requirements, so that a larger/broader set of playback addresses 222 can be returned. In some embodiments, server 104 can also return all playback addresses corresponding to all available transcoded video files of the requested video as the set of video playback addresses 222 back to user device 102, so that the largest/broadest set of playback addresses 222 can be returned.

In addition, server 104 also generates and returns, e.g., along with set of playback addresses 222 and the playback configuration files, a recommended playback order for the set of video playback addresses 222. More specifically, the recommended playback order specifies in what recommended order, from the first/highest to the last/lowest, the transcoded videos corresponding to the set of video playback addresses 222 should be selected and played back on user device 102. In some embodiments, server 104 simply generates the recommended playback order based on the overall qualities (including both encoding modes and resolutions) of the videos corresponding to playback addresses 222, and assigns the highest order to the highest quality video and the lowest order to the lowest quality video, and anything in between based on the corresponding video qualities in the same manner.

In some embodiments, after receiving the set of video playback addresses 222 and the recommended playback order on user device 102, selection module 206 of video player 200 is configured to select a subset of video playback addresses from the set of received video playback addresses 222 that meets the requirements of the device version of user device 102 and the browser version of browser 110, and subsequently selects from the subset of video playback addresses a first playback address having the highest order in the received recommended playback order. Selection module 206 next obtains a first target video from server 104 or remote servers 120 based on the selected first video playback address, and starts the playback of the first target video. Next, during the playback of the first target video, if a playback issue such as video stuttering, glitching, freezing, skipping, lagging, error reporting has occurred, selection module 206 of video player 200 is configured to immediately select from the subset of video playback addresses, a second playback address having the second highest order in the received recommended order. Selection module 206 next obtains a second target video from server 104 or remote servers 120 based on the selected second video playback address. Next, playback module 208 stops playing the first target video file and immediately starts playing the second target video at the timestamp when the first target video stops. Note that because the second target video has a lower overall quality than the first target video, it is possible to resolve the playback issue by playing the second target video in place of the first target video. Note also that if the playback issue persists, selection module 206 can then select from the subset of video playback addresses a third playback address having the third highest order in the received recommended order, and obtain the third target video to play back. Note that the above described process can continue until selection module 206 obtains a target video within the set of received video playback addresses 222 that allows for playing back the requested video without any playback issues.

Alternatively, instead of first selecting the subset of video playback addresses based on the device version and the browser version, selection module 206 can simply select a first playback address in the set of received video playback addresses 222 corresponding to the highest ordered video in the received recommended playback order, i.e., the highest quality video in the set of received video playback addresses 222. Selection module 206 next obtains the highest quality video from server 104 or remote servers 120 based on the first selected video playback address. Next, during the playback of the highest quality video, if a playback issue occurs, selection module 206 of video player 200 is configured to then select a second playback address in the set of received video playback addresses 222 corresponding to the second highest ordered video in the received recommended playback order. Selection module 206 next obtains a second transcoded video from server 104 or remote servers 120 based on the second selected playback address and begins playing the second transcoded video at where the first transcoded video stops playing. Note that because the second transcoded video has a lower overall quality than the first transcoded video, it is possible to resolve the playback issue by playing the second transcoded video in place of the first transcoded video. Note that if the playback issue persists, selection module 206 can then select the third playback address in the set of received video playback addresses 222 corresponding to the third highest ordered video in the received recommended playback order, and obtain the transcoded video to play back. Note that the above described process can continue until selection module 206 obtains a target video that allows for playing back the requested video without any playback issues.

In the above-described user-device-centric techniques, user device 102 dynamically selects which recommended video file version to play based on the real-time playback conditions during the playback process. More specifically, user device 102 can start playing a video file version having the highest recommended playback order and the best video quality. However, if problem occurs, user device 102 can dynamically scale back to the next best quality video in the recommended list of video versions. In particular, if the playback issues are caused by the local network conditions, resolving the playback issues locally and dynamically at user device 102 can be significantly faster and more efficient than sending playback quality information back to server 104 and let server 104 to analyze the playback issue and determine a new video playback address for user device 102 as described above in the user-device-server interactive techniques.

Note that when user device 102 is allowed to resolve playback issues during video playbacks, server 104 only needs to provide the largest/broadest set of available video playback addresses with the recommended playback order and let user device 102 to make real-time selections and dynamic adjustments of the video versions and video qualities of the requested video to be played. Note that user device 102 can still send network status information and playback quality information to server 104 during the playback. Server 104 can analyze the received network status information and playback quality information, and effectuate changes in future playback recommendations based on the data analysis results. For example, server 104 may not recommend certain video qualities for certain user device types in the future recommendations if the current recommendations for the user device types are determined to repeatedly result in playback issues on these user device types.

In some embodiments, selection module 206 in user device 102 is additionally configured to receive a blacklist from server 104 via receiving module 204, wherein the blacklist includes a second set of video playback addresses that do not support the device type and/or the browser type specified in the video playback request 220. Note that server 104 can add playback addresses into the blacklist of video playback addresses based on above-described analyses of the received network status information and playback quality information from user device 102. In some embodiments, selection module 206 is further configured to prevent any address in the second set of video playback addresses specified in the blacklist from being selected for playback and from being accessed by playback module 208.

Figure 3:
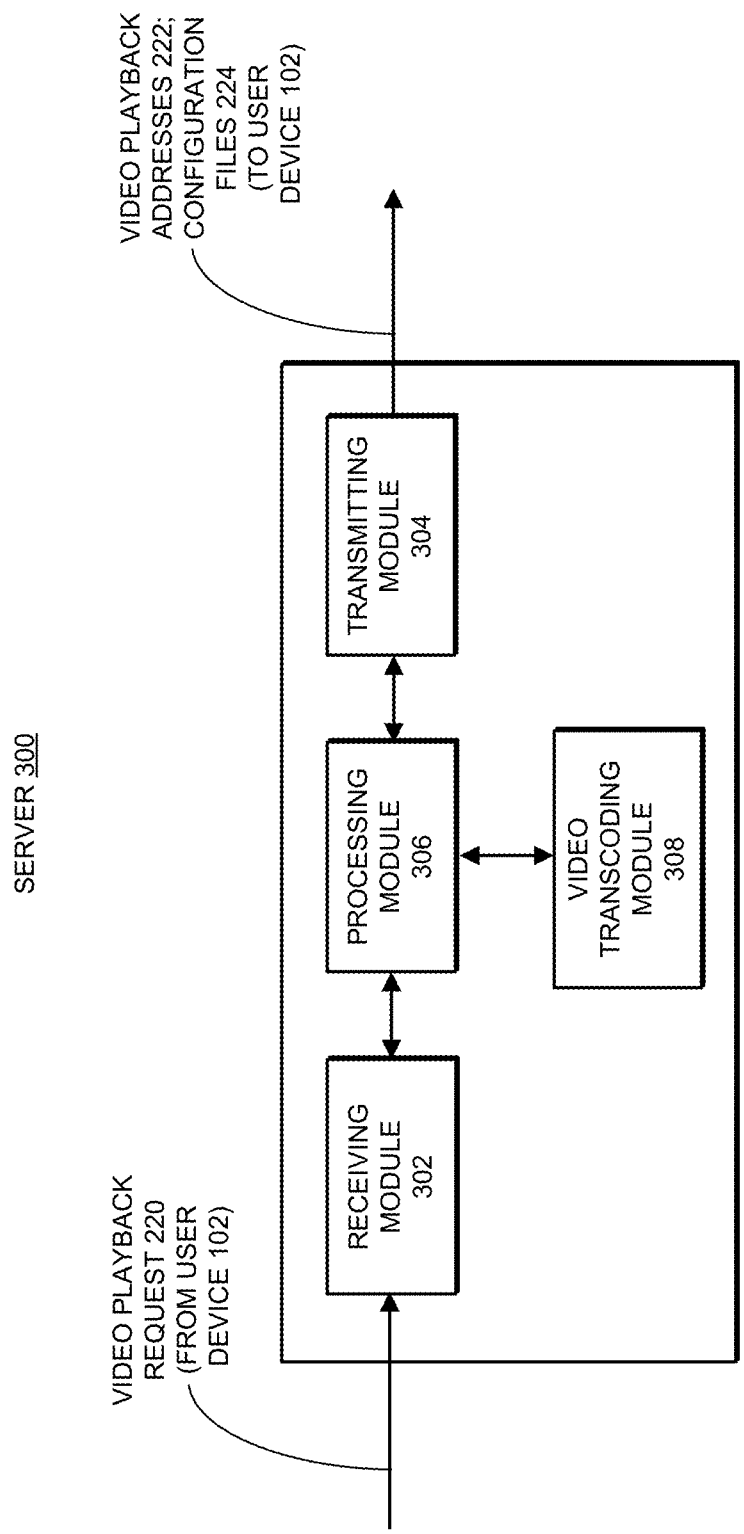
FIG. 3 shows a block diagram of a server which is an exemplary implementation of the server described in conjunction with FIG. 1 in accordance with some embodiments described herein.

FIG. 3 shows a block diagram of a server 300 which is an exemplary implementation of server 104 in client-server environment 100 in accordance with some embodiments described herein. Note that server 300 will be described and should be understood in conjunction with both video player 200 in FIG. 2 and user device 102 of FIG. 1. As shown in FIG. 3, server 300 comprises at least a receiving module 302, a transmitting module 304, and a processing module 306 coupled to both receiving module 302 and transmitting module 304.

In some embodiments, receiving module 302 of server 300 is configured to receive a video playback requests 220 sent by video player 112 of user device 102 configured to request a video file from server 300. Note that this video playback request 220 is an instance of video playback requests 220 described in conjunction with exemplary video player 200 in FIG. 2. As such, the received video playback request 220 can include the device type of user device 102 and the browser type of web browser 110. In some embodiments, the received video playback request 220 can also include network status information of the local area network where user device 102 is located and connected to. Furthermore, as described above, if the video playback request 220 is received by server 300 during a video playback process of video player 200, the received video playback request 220 can additionally include real-time playback quality information.

In some embodiments, processing module 306 of server 300 is configured to generate a set of video playback addresses 222 and a corresponding set of video playback configuration files 224 in response to the received video playback request 220, and in particular based on the device type and browser type specified in the received video playback request 220. Note that the set of video playback addresses 222 and the corresponding set of video playback configuration files 224 herein in conjunction with FIG. 3 are equivalent to video playback addresses 222 and the corresponding playback configuration files 224 described in conjunction with exemplary video player 200 in FIG. 2.

Note that the set of video playback addresses 222 specifies a set of storage locations storing a set of transcoded video files of the requested video within a storage device (e.g., storage device 122 within server 104), wherein a different transcoded video file in the set of transcoded video files (e.g., of a unique encoding scheme and/or video resolution/quality) is stored at a different storage location in the set of storage locations. In some embodiments, processing module 306 of server 300 is also configured to generate a recommended playback order for the set of video playback addresses 222, wherein the recommended playback order specifies in what recommended order, from the first/highest to the last/lowest, the transcoded videos corresponding to the set of video playback addresses 222 should be selected and played back on user device 102.

In some embodiments, processing module 306 is configured to generate the set of video playback addresses 222 based on the received device type, i.e., hardware environment of user device 102, the OS type of user device 102, and the browser type and the browser version of user device 102 for playing back a requested video. In some embodiments, processing module 306 is configured to generate the set of video playback addresses 222 based on the received network status information associated with user device 102, as well as the specified device type and browser type of user device 102. For example, processing module 306 can determine one or more suitable video encoding formats that match the specified device type and browser type of user device 102, and subsequently generate a set of video playback addresses 222 which are associated with the determined video encoding formats.

For example, processing module 306 can analyze the device type of user device 102 to derive the processor type of user device 102, and subsequently determine if the processor type supports the specific encoding format (e.g., H.264) of the online video file associated with the video playback address 222. Based on the obtained hardware information, even if the specific processor type does not generally support the encoding format, processing module 306 can generate a video playback configuration file for the online video file that will enable the playback of the online video file on user device 102.

In some embodiments, each video playback configuration file 224 is generated based at least on: (1) the hardware environment of user device 102 which can be determined based on the received device type; and (2) the received type and version of the browser of user device 102. Note that the recommended playback order can be included in each video playback configuration file 224. In some embodiments, processing module 306 is also configured to include the following information within a given video playback configuration file 224: the video dimensions, a caching method, subtitle information, and embedded video ads information, among other. Hence, during the playback of a selected video file which is an embedded video advertisement on user device 102, the video player 200 can use the corresponding playback configuration file to configure a set of video playback parameters and the playback mode of the embedded video advertisement, and play back the embedded video advertisement without being restricted by the browser's native video tag, such as a "<video>" tag.

In some embodiments, each video playback configuration file in the set of video playback configuration files 224 corresponds to each video playback address in the set of video playback addresses 222 (i.e., one-to-one correspondences). For example, during a video playback process, server 300 can send a set of playback addresses A={Addr_1, Addr_1, Addr_n} and the configuration set of configuration files F={File_1, File_2, . . . , File_n} back to the requesting user device 102. In these embodiments, for any playback address i in the address set A, there is a corresponding configuration file i in the configuration file set F. In these embodiments, for each generated video playback address 222, processing module 306 is configured to generate a corresponding video playback configuration file 224 to ensure that the video file associated with the video playback address 222 can be properly played back on the user device.

In other embodiments, each video playback configuration file in the set of video playback configuration files 224 corresponds to multiple playback addresses in the set of video playback addresses 222 (i.e., one-to-many correspondences). For example, during a video playback process, server 300 can send a set of playback addresses A={Addr_1, Addr_2, . . . , Addr_m, Addr_m+1, Addr_n} and the configuration set of configuration files F={File_1, File_2} back to the requesting user device 102, wherein File_1 corresponds to the first subset of playback addresses {Addr_1, Addr_2, . . . , Addr_m}; whereas File_2 corresponds to the second subset of playback addresses {Addr_m+1, . . . , Addr_n}. Note that the recommended playback order can be included in each of the set of configuration files F={File_1, File_2}. In still other embodiments, the set of video playback configuration files 224 can be combined into a single video playback configuration file 224 (i.e., a one-to-all correspondence). For example, during a video playback process, server 300 can send a set of playback addresses A={Addr_1, Addr_1, . . . , Addr_n} and the configuration file F back to the requesting user device 102, wherein the recommended playback order can be included in the configuration files F.

In some embodiments, transmitting module 304 of server 300 is configured to send the generated video playback addresses 222 and corresponding video playback configuration files 224 to user device 102, and specifically to video player 112/200 which sends the video playback request 220. In some embodiments, processing module 306 is further configured to generate a blacklist of video playback addresses, wherein each video playback address in the blacklist is determined to not support the device type and/or browser type specified in the video playback request 220. In some embodiments, transmitting module 304 can be further configured to send the generated blacklist along with the generated video playback addresses 222 and the corresponding video playback configuration files 224 to user device 102 in response to a video playback request 220.

As mentioned above, server 300 can receive real-time video playback quality information from user device 102 during a video playback session on user device 102, and this real-time video playback quality information can be received by way of a new video playback request 220 along with the device type and browser type. After receiving the real-time video playback quality information from user device 102, processing module 306 can be configured to analyze the received playback quality information and determine the reason for a given detected playback anomaly included in the playback quality information. Processing module 306 can then determine an alternative video playback address/video file and corresponding playback configuration information based on the determined reason for the detected playback anomaly which would improve the video playback quality. Transmitting module 304 is further configured to send the new video playback address and the corresponding configuration information to user device 102. After receiving the new video playback address from server 300, user device 102 can stop playing the current video file and begin playing the new video file corresponding to the new video playback address to avoid further negative playback effect and to improve playback experience.

Alternatively, in the above-described user-device-centric playback techniques, instead of letting server 300 to resolve the real-time playback issues occurred on user device 102 based on the real-time video playback quality information, user device 102/video player 200 can resolve the playback issues locally in real-time. In these alternative embodiments, server 300 is configured to generate and return a larger/broader set of playback addresses corresponding to a larger/broader set of the transcoded video files of the requested video in response to a video playback request 220 that meets at least some partial requirements in video playback request 220. For example, server 300 can return all playback addresses of those transcoded video files that meet at least one of the received device type requirement and the browser type requirement, instead of meeting both device type and browser requirements, so that a larger/broader set of playback addresses 222 can be generated and returned. In some embodiments, server 300 can also return all available playback addresses corresponding to all available transcoded video files of the requested video as the set of video playback addresses 222 back to user device 102, so that the largest/broadest set of playback addresses 222 can be returned.

In these alternative embodiments, server 300 also generates and returns, e.g., along with set of playback addresses 222 and the playback configuration files 224, a recommended playback order for the set of video playback addresses 222. More specifically, the recommended playback order specifies in what recommended order, from the first/highest to the last/lowest, the transcoded videos corresponding to the set of video playback addresses 222 should be selected and played back on user device 102. In some embodiments, server 300 simply generates the recommended playback order based on the overall qualities (including both encoding modes and resolutions) of the online videos corresponding to playback addresses 222, and assigns the highest order to the highest quality video and the lowest order to the lowest quality video, and anything in between based on the corresponding video qualities in the same manner.

Note that in these alternative embodiments, server 300 only needs to provide the largest/broadest set of available video playback addresses 222 with the recommended playback order and let user device 102 to make real-time selections and dynamic adjustments of the video versions and video qualities of the requested video to be played. Note that user device 102 can still send network status information and playback quality information to server 300 during the playback. Server 300 can still analyze the received network status information and playback quality information and generate results based on the data analyses. However, instead of generating an updated playback option for user device 102 in real time, the results from the data analyses are used to effectuate changes in future playback recommendations based on the data analysis results. For example, server 300 may not recommend certain video qualities for certain user device types in the future recommendations if the current recommendations for the user device types are determined to repeatedly result in playback issues on these user device types. In some embodiments, server 300 can also add certain playback addresses into the blacklist of video playback addresses based on above-described analyses of the received network status information and playback quality information from user device 102.

In some embodiments, server 300 can also include a video transcoding module 308 coupled to processing module 306 and configured to receive an uploaded video, such as interactive video ad, from a user via network 106, and subsequently generate a set of transcoded videos of the uploaded video by transcoding the uploaded video with multiple encoding schemes and qualities. For example, transcoding module 308 can transcode the uploaded video into a set of video files of multiple different encoding formats including, but are not limited to MPEG-1, MPEG-4, H.264, WebM, and Ogg. Transcoding module 308 can also transcode the uploaded video into a set of video files of various video qualities/resolutions including but are not limited to 360p, 480p, 720p, 1080p, 1440p and 4K.

In some embodiments, transcoding module 308 can transcode the uploaded video into a set of video files wherein each of the video files is encoded with a unique combination of the above-described encoding formats and video qualities/resolutions. For each of the multiple transcoded video files of the uploaded video, transcoding module 308 is further configured to generate a corresponding and unique video playback address specifying the storage location of the corresponding transcoded video file. Note that in response to a subsequent video playback request involving the uploaded video file, server 300 can generate the set of video playback addresses 222 from the set of video playback addresses associated with the multiple transcoded video files.

Note that while transcoding module 308 is shown to be disposed within server 300, other embodiments can have transcoding module 308 separately from server 300, e.g., as a standalone device. For example, when video processing tasks are heavy, implementing video transcoding module 308 as an independent device separated from server 300 can reduce the workload of server 300, and improve the video transcoding efficiency.

Figure 4:
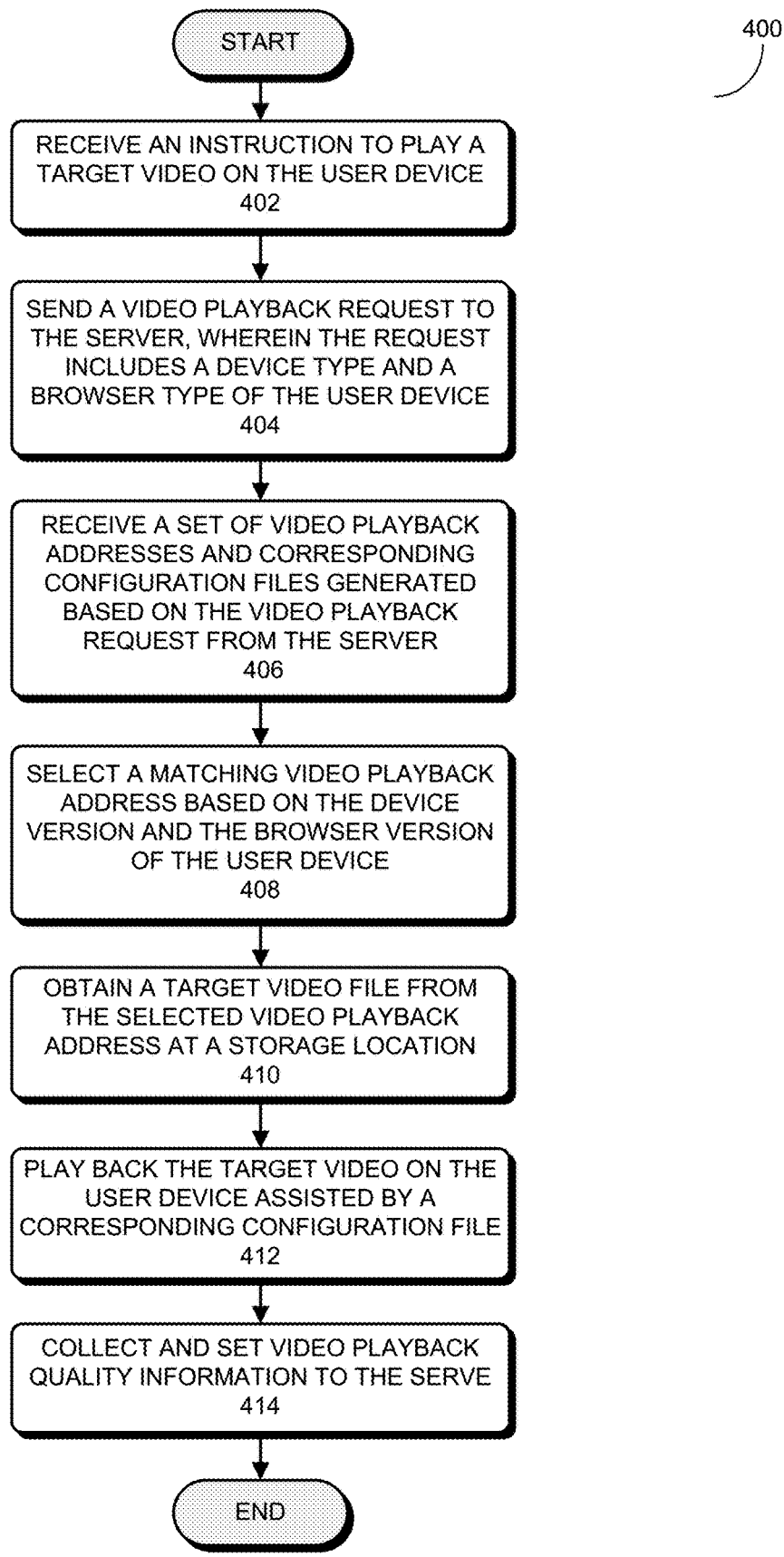
FIG. 4 presents a flowchart illustrating an exemplary client-side process for playing an online video on an end-user device in accordance with some embodiments described herein.

FIG. 4 presents a flowchart illustrating an exemplary client-side process 400 for playing an online video on an end-user device in accordance with some embodiments described herein. In one or more embodiments, one or more of the steps in FIG. 4 may be omitted, repeated, and/or performed in a different order. Accordingly, the specific arrangement of steps shown in FIG. 4 should not be construed as limiting the scope of the technique. Note that client-side process 400 is described in the scope of client-server environment 100 and in conjunction with both exemplary video player 200 (of user device 102) of FIG. 2 and exemplary server 300 of FIG. 3. In particular, process 400 can be performed by either video player 102 described in FIG. 1 or video player 200 described in FIG. 3.

Process 400 may begin when an instruction to play a target video on the user device is received (step 402). For example, the video play instruction can be automatically generated during the execution of a native application, such as a web application, when a line of code including a video link to play an online video is reached. In some embodiments, the video associated with the video link is an online video ad. Alternatively, the video play instruction can be manually generated by a user of the user device clicking on the video link in the browser.

Next, process 400 sends a playback request for the online video from the user device to the server, wherein the video playback request includes at least a device type and a browser type of the user device (step 404). As described above, the user device is configured with a web-based video playback function through a display and a browser. The user device can include a mobile phone, a tablet computer, or a notebook computer, among others. In some embodiments, the device type can include information such as the brand and model of the user device. Moreover, the same device type of the user device can have multiple device versions as a result of hardware and software upgrades on the user device. For example, mobile phones of brand "A" can include various models such as "X1," "X2," "X3," etc. Furthermore, for mobile phones of the same brand and model, such as brand "A" and model "X2," there can be multiple versions, such as "V1.1," "V2.4," etc. Moreover, for mobile phones of the same brand, model, and version, such as brand "A," model "X2," and version "V1.1," they can support multiple mobile system software versions.

As mentioned above, the user device can include a browser, which further includes a video player app or video player capable of playing web-based videos. In some embodiments, the video player is written in JavaScript or in C-programming language. In some embodiment, the video player within the browser is configured to support playing videos of HTML5 (or "H5") standard. In some implementations of the user device, the browser can include WebView®. The browser type can include browser information such as the brand and model of the browser. Browsers of the same browser type can also have various versions as a result of version upgrades. For example, browser brand Internet Explorer and corresponding browser model IE11 further includes multiple versions such as IE11.1, IE11.2, among others.

Next, process 400 receives a set of video playback addresses and corresponding video playback configuration files from the server, wherein the set of video playback addresses and the corresponding video playback configuration files are generated by the server based on the video playback request which includes the device type and the browser type (step 406). Note that the received set of video playback addresses specifies a set of storage locations storing a set of transcoded video files of the requested video within a storage device, wherein a different transcoded video file in the set of transcoded video files is stored at a different storage location in the set of storage locations. In some embodiments, along with the set of video playback addresses, process 400 also receives a recommended playback order for the set of video playback addresses, wherein the recommended playback order specifies in what recommended order, from the first/highest to the last/lowest, the transcoded videos corresponding to the set of video playback addresses should be selected and played back on the user device.

In some embodiments, along with the set of video playback addresses, process 400 can also receive a blacklist from the server, wherein the blacklist includes a second set of video playback addresses and corresponding video files that are not supported by the device type and browser type specified in the video playback request. Specifically, during actual video playback processes, there can be situations where a user device of a certain type and a certain version that cannot play a video of a specific encoding format, or there may be special cases where a web browser of a certain type and a certain version cannot load a video of a specific encoding format. In some embodiments, the server can record video playback addresses associated with these special situations and cases in the blacklist and send the backlist to the video player. Based on the blacklist, the video player of the user device can avoid selecting those video playback addresses included in the backlist, so as not to affect the playback quality.

In some embodiments, video playback request in step 404 can also include network status information of a local area network where the user device is located and connected to. For example, this network status information can include the type of the local area network, which can include but are not limited to: a 3G network, a 4G network, a 5G network, a wired local area network, a wireless network, and so on. The network status information may also include the transmission status of the local area network, including but are not limited to: the highest data transmission rate, an average transmission rate, and a median transmission rate of the local area network. Note that in these embodiments, the set of video playback addresses and the corresponding video playback configuration files are generated by the server based on the video playback request which includes the network status information, the device type and the browser type.

Process 400 next selects a video playback address among the set of received video playback addresses corresponding to a transcoded version of the online video that matches the device version and the browser version of the user device (step 408). In some embodiments, if the server has provided the blacklist for the user device and browser, selecting the video playback address would also including rejecting any address in the set of video playback addresses that is in the blacklist.

In some embodiments, selecting the video playback address at step 408 further involves determining if the user device supports WebAssembly. If the user device supports WebAssembly, process 400 then selects a video playback address in the set of video playback addresses corresponding to a video file that is based on H.264 encoding format. However, if the user device does not support WebAssembly, process 400 then selects a video playback address in the set of video playback addresses corresponding to a video file that is based on MPEG-1 encoding format.

Note that WebAssembly is a webpage assembly language which has the characteristics of portability, small size, fast loading, and compatibility with the World Wide Web. WebAssembly is a new specification formulated by the W3C (World Wide Web Consortium) community group composed of mainstream browser manufacturers. WebAssembly also has the characteristics of high efficiency, high security, high openness and highly standard, among other. More specifically, for those user devices that support WebAssembly, they can typically support the playbacks of higher-resolution video formats, and therefore can be provided with videos encoded in H.264 format.

In contrast, for those user devices that do not support WebAssembly, they can be provided with MPEG-1 encoded videos due to their poor video playback capabilities for H.264 format videos. MPEG-1 is the first video and audio lossy compression standard formulated by MPEG (Moving Picture Experts Group). H.264 is the tenth part of MPEG-4. It is a highly compressed digital video codec standard proposed by the Joint Video Team (JVT, Joint Video Team) composed of VCEG (Video Coding Experts Group) and MPEG. The videos generated based on MPEG-1 encoding scheme typically have lower resolutions and also lower requirements for the network transmission bandwidth. In comparison, the videos generated based on H.264 encoding scheme typically have higher resolutions and also higher requirements for the network transmission bandwidth.

Process 400 subsequently obtains a target video file, such as an interactive video advertisement (ad) from the storage location specified by the selected video playback address (step 410). Next, process 400 plays back the target video file on the user device with the assistance of a corresponding video playback configuration file (step 412). In some embodiments, the video playback configuration file can include the video dimensions, the caching method, subtitle information, and embedded video ad information. Note that if the target video is an embedded video ad, the video player can use the configuration file to configure the video playback parameters and the playback mode of the embedded video ad, and then play the embedded video ad without being restricted by the browser's native video tag, such as a "<video>" tag.

Optionally, process 400 can also collect video playback quality information during the playback of the target video file, and send the video playback quality information to the server in real-time (step 414). In particular, this real-time video playback quality information can include any detected playback anomaly, such as video stuttering, glitching, freezing, skipping, lagging, and error reporting. In some embodiments, the real-time video playback quality information can be combined with the device type and browser type to generate a new video playback request, which is subsequently sent to the server. The server can then analyze the received playback quality information and determine the reason for each detected playback issue included in the playback quality information. If such playback issue is detected, the server can then determine an alternative video playback address based on the determined reason which would improve the video playback quality. The server subsequently sends the new video playback address and the corresponding configuration information to the user device.

For example, when video freeze or lag occurs during a video playback, the video player can send playback data such as the time when the video freeze occurred along with the network status information to the server. If the server analyzes the received data and determines that the internet connection is poor, the server can select and send another video playback address to the user device, wherein the video quality associated with the new video playback address is more suitable for the poor network connection. As another example, if during the online video playback, an error box keeps popping up to prevent the video from playing properly, the video player can send playback quality information such as the abnormal event and erroneous environment variables as feedback to the server. After receiving the feedback information and analyzing the error messages, the server returns a video playback address associated with another video quality that can be played normally in the video player to the user device.

As an optional step of process 400, if a new video playback address and a corresponding configuration file are received from the server in response to the playback quality information, process 400 subsequently stops the current video playback in the video player and begins playing a new video file corresponding to the new video playback address (step 416).

Figure 5:
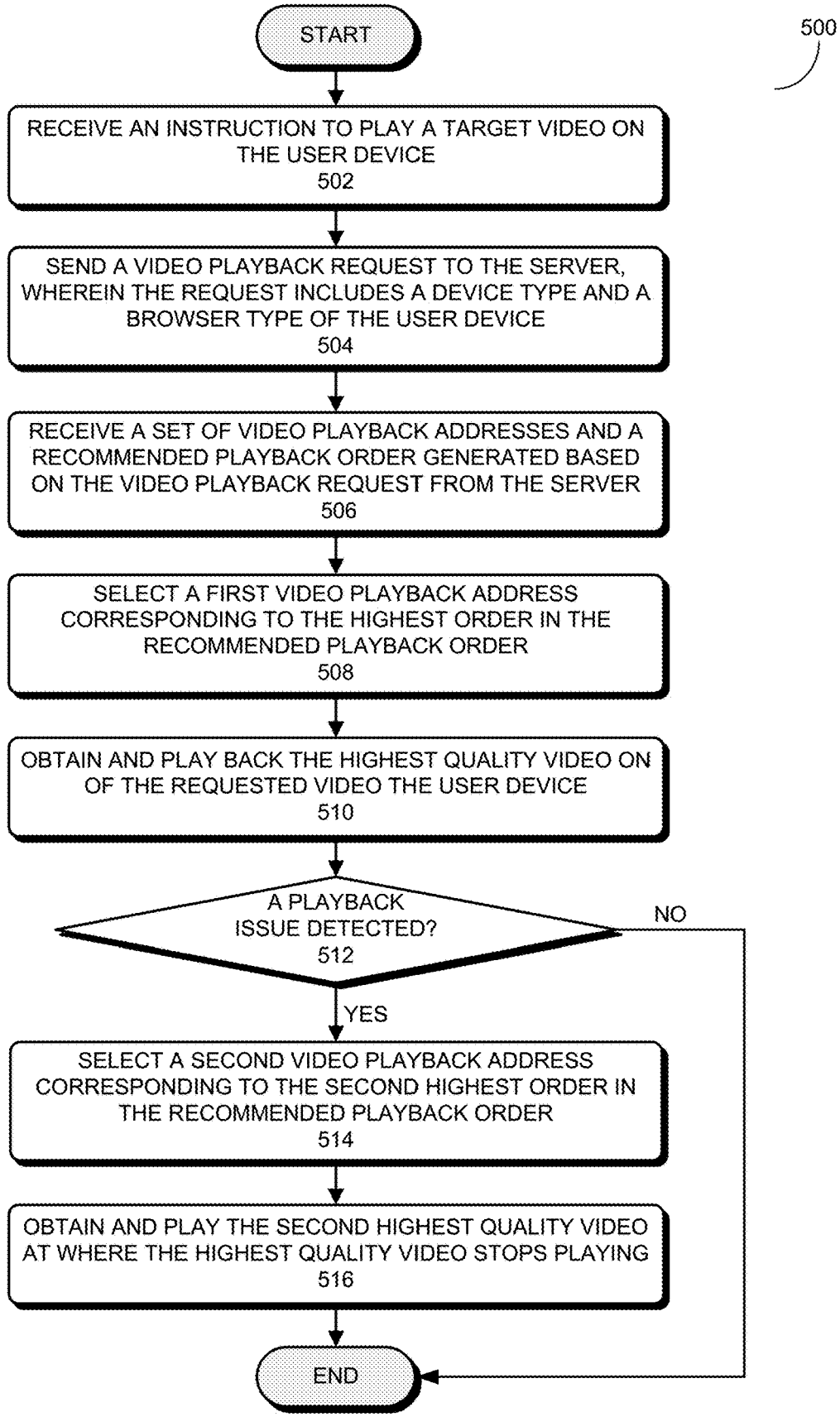
FIG. 5 presents a flowchart illustrating another exemplary client-side process for playing an online video on an end-user device in accordance with some embodiments described herein.

FIG. 5 presents a flowchart illustrating another exemplary client-side process 500 for playing an online video on an end-user device in accordance with some embodiments described herein. In one or more embodiments, one or more of the steps in FIG. 5 may be omitted, repeated, and/or performed in a different order. Accordingly, the specific arrangement of steps shown in FIG. 5 should not be construed as limiting the scope of the technique. Again, client-side process 500 is described in the scope of client-server environment 100 and in conjunction with both exemplary video player 200 (of user device 102) of FIG. 2 and exemplary server 300 of FIG. 3. In particular, process 500 can be performed by either video player 102 described in FIG. 1 or video player 200 described in FIG. 3.

Process 500 may begin when an instruction to play a target video on the user device is received (step 502). For example, the video play instruction can be automatically generated during the execution of a native application, such as a web application, when a line of code including a link to play an online video is reached. In some embodiments, the video associated with the video link is an online video ad. Alternatively, the video play instruction can be manually generated by a user of the user device clicking on the video link in the browser.

Next, process 500 sends a playback request for the online video from the user device to the server, wherein the video playback request includes at least a device type and a browser type of the user device (step 504). As mentioned above, the user device can include a browser, which further includes a video player app or video player capable of playing web-based videos. In some embodiments, the video player is written in JavaScript or in C-programming language. In some embodiment, the video player within the browser is configured to support playing videos of HTML5 (or "H5") standard. In some implementations of the user device, the browser can include WebView®.

Next, process 500 receives a set of video playback addresses and a recommended playback order from the server, wherein the set of video playback addresses and the recommended playback order are generated by the server based on the video playback request which includes the device type and the browser type (step 506). Note that the recommended playback order specifies in what recommended order, from the first/highest to the last/lowest, the transcoded videos corresponding to the set of video playback addresses should be selected and played back on the user device. Also note that the received set of video playback addresses specifies a set of storage locations storing a set of transcoded video files of the requested video within a storage device, wherein a different transcoded video file in the set of transcoded video files is stored at a different storage location in the set of storage locations.

As described above, the received set of playback addresses can correspond to a set of the transcoded video files of the requested video that meets at least some partial requirements of the device type and browser type of the user device. Alternatively, the received set of playback addresses can correspond to all available transcoded video files of the requested video.

Process 500 next selects a first video playback address among the set of received video playback addresses corresponding to the highest order (e.g., in the overall video quality) in the recommended playback order (step 508). Process 500 subsequently obtains the highest quality transcoded video of the requested video from the storage location specified by the selected first video playback address and begins to play back the highest quality transcoded video of the requested video on the user device (step 510).

During the playback of the highest quality transcoded video, process 500 constantly detects if a playback issue has occurs (step 512). If not, process 500 continues to play back the highest quality transcoded video until the end of the video. Otherwise, if a playback issue is detected, process 500 next selects a second playback address among the set of received video playback addresses corresponding to the second highest order (e.g., in the overall video quality) in the recommended playback order (step 514). Process 500 subsequently obtains the second highest quality transcoded video of the requested video from the storage location specified by the selected second video playback address and begins playing back the second highest quality transcoded video (after stopping the playback of the highest quality transcoded video) at where the highest quality transcoded video stops playing (step 516).

Figure 6:
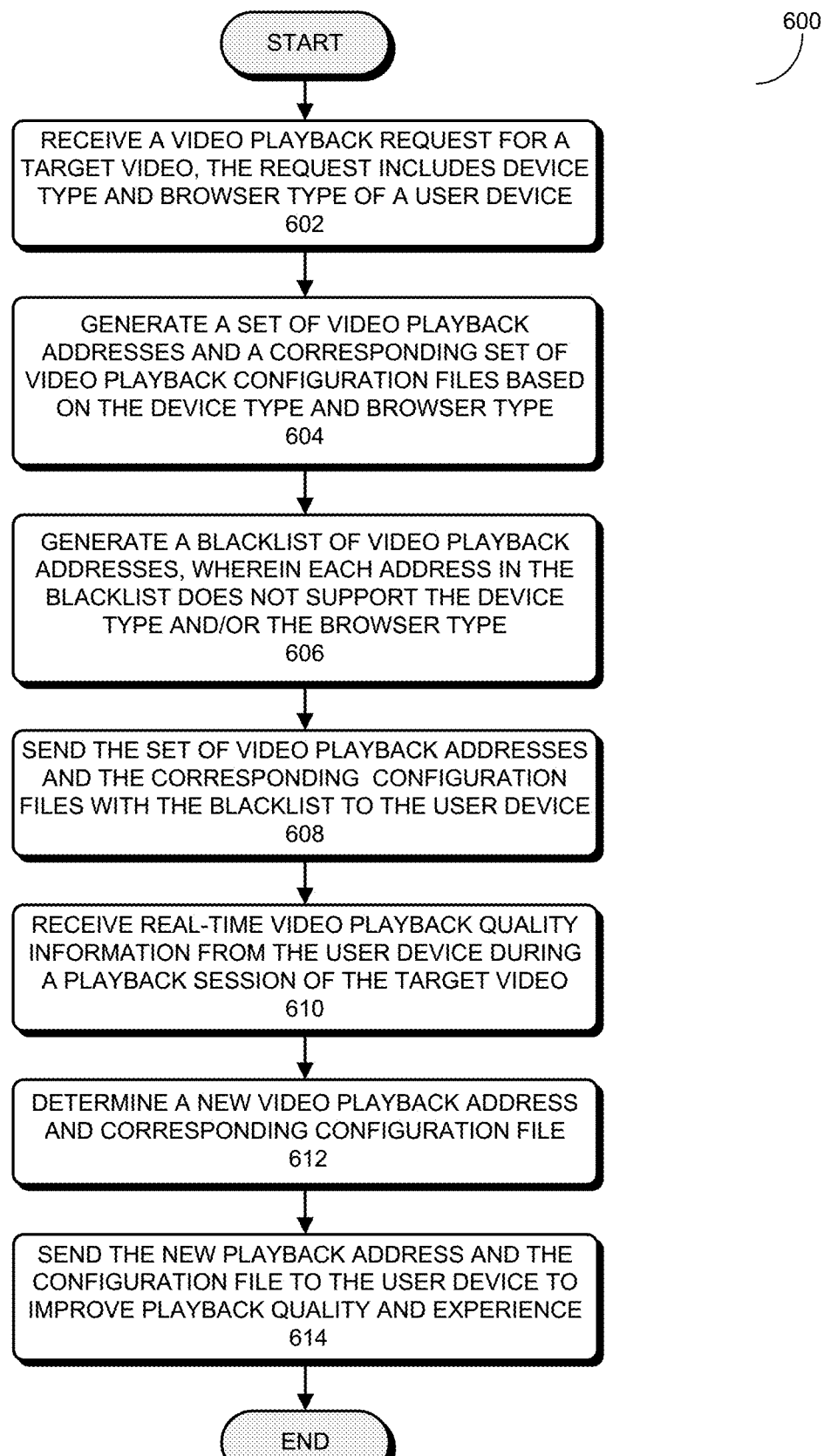
FIG. 6 presents a flowchart illustrating an exemplary server-side process for playing an online video on an end-user device in accordance with some embodiments described herein.

FIG. 6 presents a flowchart illustrating an exemplary server-side process 600 for playing an online video on an end-user device in accordance with some embodiments described herein. In one or more embodiments, one or more of the steps in FIG. 6 may be omitted, repeated, and/or performed in a different order. Accordingly, the specific arrangement of steps shown in FIG. 6 should not be construed as limiting the scope of the technique. Note that server-side process 600 is described in the scope of client-server environment 100 and in conjunction with both exemplary video player 200 (of user device 102) of FIG. 2 and exemplary server 300 of FIG. 3. In particular, process 600 can be performed by either server 104 described in FIG. 1 or server 300 described in FIG. 3.

Process 600 may begin when the server receives a video playback request for a target video, wherein the video playback request includes the device type and the browser type of the user device (step 602). For example, the video playback request can be generated and sent by the user device during the execution of a native application when a line of code including a video link to play an online video is reached. In some embodiments, the video associated with the video link is an online video ad. As mentioned above, the video playback request can additionally include network status information of a local area network wherein the user device is located and connected to.

Next, process 600 generates a set of video playback addresses and a corresponding set of video playback configuration files based on the received video playback request, and in particular based on the device type and browser type specified in the received video playback request (step 604). Note that the set of video playback addresses specifies a set of storage locations storing a set of transcoded video files of the requested video within a storage device, wherein a different transcoded video file in the set of transcoded video files is stored at a different storage location in the set of storage locations. In some embodiments, after receiving the video playback request including the device type and browser type, process 600 searches and selects in a library of all available transcoded video files of the requested video, those transcoded video files that support the specified device type and browser type. Process 600 subsequently generates the set of video playback addresses and the playback configuration files that correspond to the selected transcoded video files.

In some embodiments, process 600 also generates a recommended playback order for the generated set of video playback addresses, wherein the recommended playback order specifies in what recommended order, from the first/highest to the last/lowest, the transcoded videos corresponding to the set of video playback addresses should be selected and played back on the user device.

Optionally, process 600 also generates a blacklist of video playback addresses, wherein each video playback address in the blacklist is determined to not support the specified device type and/or browser type (step 606). In some embodiments, after receiving the video playback request including the device type and browser type, process 600 searches and selects in the library of available transcoded video files of the target video, those transcoded video files that do not support the specified device type and/or browser type. As mentioned above, there can be situations where a user device of a certain type and a certain version that cannot play a video of a specific encoding format, or there may be special cases where a web browser of a certain type and a certain version cannot load a video of a specific encoding format. Consequently, the user device can reference the blacklist to avoid selecting any video playback address in the blacklist for video playback, so as not to affect the playback experience.

Referring back to FIG. 6, process 600 next sends the set of video playback addresses that support the device type and browser type of the user device and the corresponding playback configuration files along with the blacklist of video playback addresses that do not support the device type and/or the browser type of the user device to the user device (step 608).

After sending the set of video playback addresses, process 600 can optionally receive real-time video playback quality information from the user device during a video playback session of the target video, wherein the real-time video playback quality information can be received by way of a new video playback request along with the device type and browser type of the user device (step 610). After receiving the real-time video playback quality information, process 600 can analyze the received playback quality information and determine a new video playback address and corresponding playback configuration file which can improve video playback condition (step 612). Process 600 then sends the new video playback address and the corresponding configuration file to the user device to improve playback quality and experience (step 614).

Figure 7:
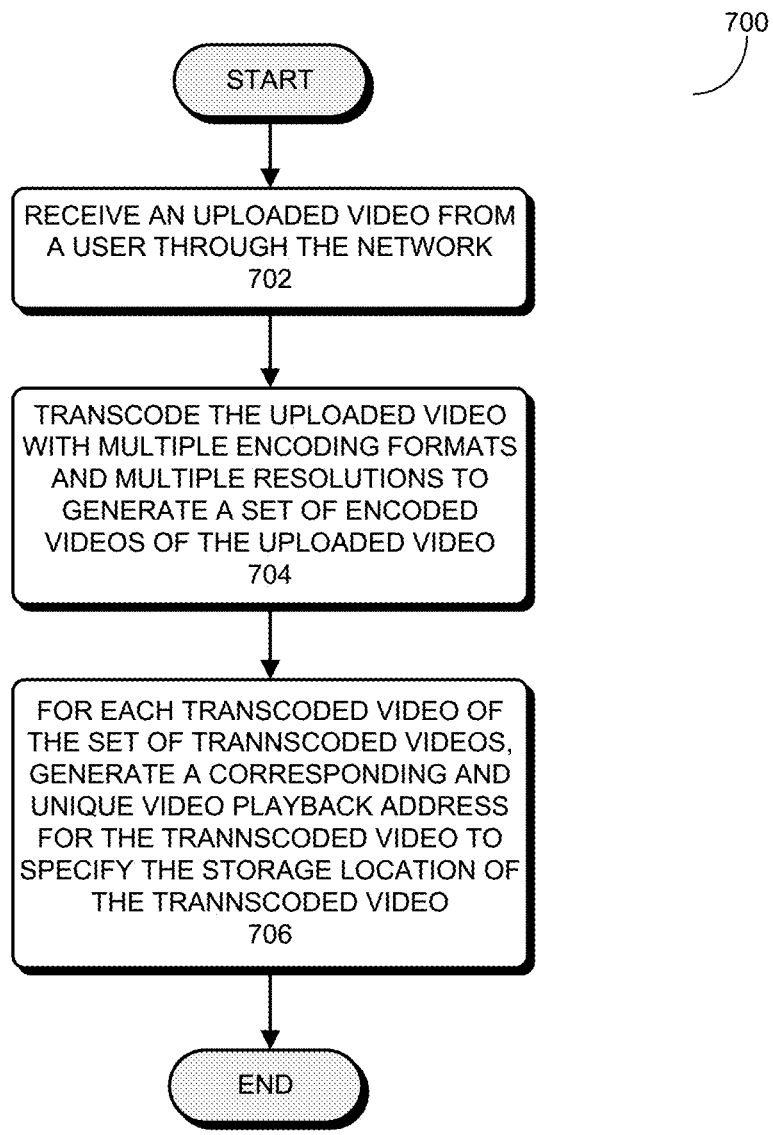
FIG. 7 presents a flowchart illustrating an exemplary process for generating a set of transcoded video files and a corresponding set of video playback addresses for an uploaded video in accordance with some embodiments described herein.

FIG. 7 presents a flowchart illustrating an exemplary process 700 for generating a set of transcoded video files and a corresponding set of video playback addresses for an uploaded video in accordance with some embodiments described herein. In one or more embodiments, one or more of the steps in FIG. 7 may be omitted, repeated, and/or performed in a different order. Accordingly, the specific arrangement of steps shown in FIG. 7 should not be construed as limiting the scope of the technique. Note that process 700 can be performed by server 104, or more specifically by video transcoding module 308 in server 300. Alternatively, process 700 can be performed by one or more remote servers 120 shown in FIG. 1.

Process 700 may begin by receiving an uploaded video from a user through the network (step 702). Next, process 700 transcodes the uploaded video with multiple encoding formats and multiple resolutions to generate a set of transcoded videos of the uploaded video (step 704). For example, process 700 can transcode the uploaded video into a set of video files of multiple different encoding formats including but are not limited to MPEG-1, MPEG-4, H.264, WebM, and Ogg. Process 700 can also transcode the uploaded video into a set of video files of various video qualities/resolutions including but are not limited to 360p, 480p, 720p, 1080p, 1440p and 4K. In some embodiments, process 700 can first transcode the uploaded video into a set of M transcoded video files corresponding to M (M>1, e.g., M=3) encoding formats. Process 700 subsequently transcodes each video in the set of M transcoded videos of different encoding formats into a set of N (N>1, e.g., N=3) transcoded videos of N video resolutions. In this manner, process 700 generates M×N (e.g., 3×3=9) transcoded videos of the uploaded video.

Next, for each transcoded video of the set of transcoded videos of the uploaded video, process 700 generates a corresponding and unique video playback address for the transcoded video to specify the storage location of the transcoded video (step 706). Note that in the subsequent video playback processes involving the uploaded video file, server 102 or server 300 can generate the set of video playback addresses 222 from the set of video playback addresses corresponding to the set of transcoded videos of the uploaded video file based on a received video playback request 220.

Embodiments of the disclosed internet/online video playback techniques can automatically select from a set of pre-generated online video files of a target video of various encoding formats and qualities/resolutions, a particular video file format allowing for the optimal playback effect among the set of pre-generated video files, based on the user device information such as the device type and version, and the browser type and version. As described in the background section, browsers often are configured to restrict playbacks of interactive video ads through native video tags. The disclosed internet/online video playback techniques can reduce reliance on a web browser's native video tags during online video playbacks, thereby improving the user experience during the online video playbacks. These improvements on internet/online video playbacks are enabled by bypassing the browser's restrictions on interactive video ads, which provides the foundation and passage for making various new video ads attempts. Moreover, the disclosed video playback techniques can significantly enhance video playback compatibility on various user devices of different software and hardware configurations, and therefore optimize playback experiences.

Moreover, the disclosed internet/online video playback techniques can provide a variety of suitable video file formats of a requested/target online video for different user devices, thereby allowing for achieving optimal playback effects on different user devices based on the models and versions of the user devices and the models and versions of the corresponding browsers, while preventing negative playback effects such as video freeze. Compared with the conventional video playback techniques which require reading the native video tags of the browser during video playbacks, the disclosed video playback techniques significantly improve the online video playback compatibilities on various user devices of different software and hardware configurations, reduce or even avoid various video playback issues such as video freeze during the online video playbacks, thereby significantly improving users' video playback experiences.

EXEMPLARY APPLICATION

In online-mobile gaming on a mobile device, a game player may be served with online video ads a number of times during the cause of game play, for example, in exchange for certain rewards such as entity spawning/respawning, increasing character health or vitality, extending character life, or getting extra character lives. The disclosed internet/online video playback techniques can be implemented in an online-mobile game, referred to as a "native app," as links to a set of video ads that can be triggered when certain events during the game play take place. More specifically, each video link can be implemented as a script, such as in Javascript, wherein the script implements the disclosed internet/online video playback technique, including the disclosed video player 112/200. I In some embodiments, when a video link is triggered during the execution of the native app, such as the online game on the mobile device, the underlining script of the video link is executed. The execution of the script can cause a new app window to open, within in which the linked video ad will be played back. For example, the new app window can be a new browser window. In some embodiments, this new browser window is implemented with WebView®. Moreover, the execution of the script also causes a disclosed video playback request to be sent to a centralized ad server (e.g., the disclosed server 102 in FIG. 1 or server 300 in FIG. 3) which stores the video files of the linked video ad. In this exemplary application, the new browser window is the disclosed browser 110 and the centralized ad server is the disclosed server 104. The video playback request subsequently triggers the disclosed client-server process. Subsequently, the video player of the new browser window obtains an optimal version of the online video ad in accordance with the disclosed client-side process, and subsequently plays the obtained video ad in the new browser window.

Note that by implementing the disclosed internet/online video playback technique in the above exemplary application, the linked video ad can be automatically played in the native app once the link is triggered, without requiring the user, e.g., the game player to click on the video link in the native app, and without requiring the user to click on a play button after the linked video ad has been downloaded from the ad server. In particular, when the new browser window is implemented with an embeddable browser such as WebView®, the video ad playback is not subjected to certain restrictions from the native video tags (e.g., HTML video tags) of a native browser (e.g., a Chrome® player, or a Safari® player) installed on the mobile device, thereby allowing a video autoplay feature in the script to be enabled in the new browser window.

Figure 8:
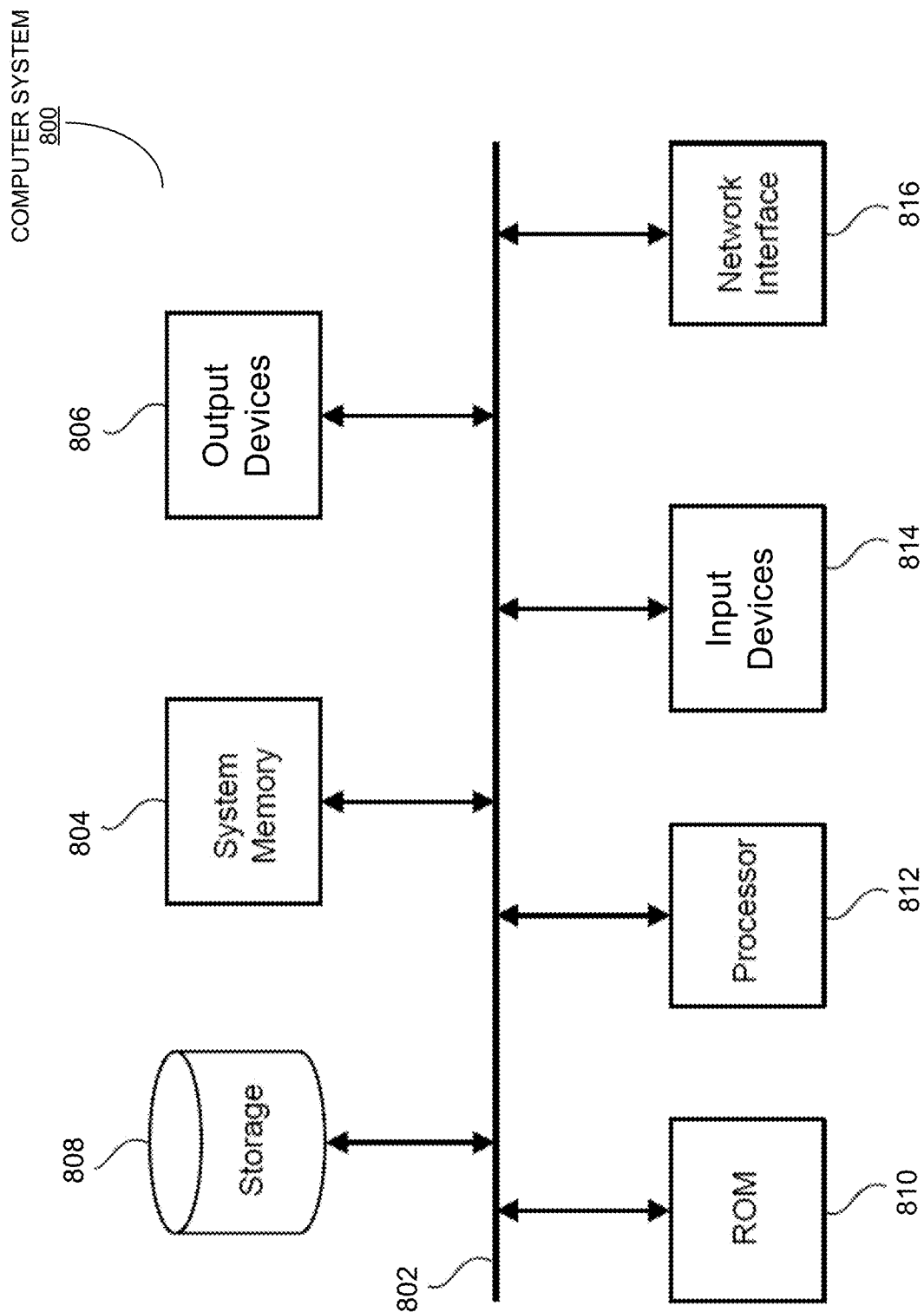
FIG. 8 conceptually illustrates a computer system with which some embodiments of the subject technology can be implemented.

FIG. 8 conceptually illustrates a computer system with which some embodiments of the subject technology can be implemented. Computer system 800 can be a client, a server, a computer, a smartphone, a PDA, a laptop, or a tablet computer with one or more processors embedded therein or coupled thereto, or any other sort of computing device. Such a computer system includes various types of computer-readable media and interfaces for various other types of computer-readable media. Computer system 800 includes a bus 802, processing unit(s) 812, a system memory 804, a read-only memory (ROM) 810, a permanent storage device 808, an input device interface 814, an output device interface 806, and a network interface 816. In some embodiments, computer system 800 can include both user device 102 and server 104.

Bus 802 collectively represents all system, peripheral, and chipset buses that communicatively connect the numerous internal devices of computer system 800. For instance, bus 802 communicatively connects processing unit(s) 812 with ROM 810, system memory 804, and permanent storage device 808.

From these various memory units, processing unit(s) 812 retrieves instructions to execute and data to process in order to execute various processes described in this patent disclosure, including the above-described various client-side processes for playing an internet/online video on an end-user device and the server-side processes for playing an internet/online video on an end-user device in conjunction with FIGS. 2-7. The processing unit(s) 812 can include any type of processor, including, but not limited to, a microprocessor, a graphics processing unit (GPU), a tensor processing unit (TPU), an intelligent processor unit (IPU), a digital signal processor (DSP), a field-programmable gate array (FPGA), and an application-specific integrated circuit (ASIC). Processing unit(s) 812 can be a single processor or a multi-core processor in different implementations.

ROM 810 stores static data and instructions that are needed by processing unit(s) 812 and other modules of the computer system. Permanent storage device 808, on the other hand, is a read-and-write memory device. This device is a non-volatile memory unit that stores instructions and data even when computer system 800 is off. Some implementations of the subject disclosure use a mass-storage device (such as a magnetic or optical disk and its corresponding disk drive) as permanent storage device 808.

Other implementations use a removable storage device (such as a floppy disk, flash drive, and its corresponding disk drive) as permanent storage device 808. Like permanent storage device 808, system memory 804 is a read-and-write memory device. However, unlike storage device 808, system memory 804 is a volatile read-and-write memory, such as a random access memory. System memory 804 stores some of the instructions and data that the processor needs at runtime. In some implementations, various processes described in this patent disclosure, including the above-described various client-side processes for playing an internet/online video on an end-user device and the server-side processes for playing an internet/online video on an end-user device in conjunction with FIGS. 2-7, are stored in system memory 804, permanent storage device 808, and/or ROM 810. From these various memory units, processing unit(s) 812 retrieve instructions to execute and data to process in order to execute the processes of some implementations.

Bus 802 also connects to input and output devices 814 and 806. Input devices 814 enable the user to communicate information to and select commands for the computer system. Input devices 814 can include, for example, alphanumeric keyboards and pointing devices (also called "cursor control devices"). Output devices 806 enable, for example, the display of images generated by computer system 800. Output devices 806 can include, for example, printers and display devices, such as cathode ray tubes (CRT) or liquid crystal displays (LCD). Some implementations include devices such as a touchscreen that functions as both input and output devices.

Finally, as shown in FIG. 8, bus 802 also couples computer system 800 to a network (not shown) through a network interface 816. In this manner, the computer can be a part of a network of computers (such as a local area network ("LAN"), a wide area network ("WAN"), an intranet, or a network of networks, such as the Internet. Any or all components of computer system 800 can be used in conjunction with the subject disclosure.

The various illustrative logical blocks, modules, circuits, and algorithm steps described in connection with the embodiments disclosed in this patent disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein may be implemented or performed with a general-purpose processor, a digital signal processor (DSP), an application-specific integrated circuit (ASIC), a field-programmable gate array (FPGA) or other programmable-logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, flash memory, CD-ROM or other optical disk storage, magnetic disk storage or other magnetic storage devices, or any other medium that may be used to store desired program code in the form of instructions or data structures and that may be accessed by a computer. Disk and disc, as used herein, include compact disc (CD), laser disc, optical disc, digital versatile disc (DVD), floppy disk, and Blu-ray disc, where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer-program product.

While this patent document contains many specifics, these should not be construed as limitations on the scope of any disclosed technology or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A computer-implemented method for playing online videos on a user device, the method comprising:
   sending a video playback request for playing back an online video to a server, wherein the video playback request includes at least a device type and a browser type of the user device;
   receiving a set of video playback addresses and a set of video playback configuration files from the server, wherein the set of video playback addresses and the set of video playback configuration files are generated based at least on the device type and the browser type;
   selecting a video playback address from the set of video playback addresses corresponding to a transcoded version of the online video that matches a device version and a browser version of the user device, which includes:
      if the user device supports WebAssembly, selecting a video playback address in the set of video playback addresses corresponding to a first copy of the online video which was transcoded based on a H.264 encoding format; and
      if the user device does not support WebAssembly, selecting a video playback address in the set of video playback addresses corresponding to a second copy of the online video which was transcoded based on a MPEG-1 encoding format;
   obtaining the transcoded video from the selected video playback address; and
   playing back the obtained video on the user device using a corresponding video playback configuration file in the set of video playback configuration files.

2. The computer-implemented method of claim 1, wherein each video playback address in the set of video playback addresses corresponds to a respective configuration file in the set of video playback configuration files.

3. The computer-implemented method of claim 1, wherein the video playback request further includes network status information, and wherein the set of video playback addresses and the set of video playback configuration files are generated based on the network status information, the device type and the browser type.

4. The computer-implemented method of claim 1, wherein the method further comprises:
   receiving a blacklist from the server, wherein the blacklist includes a second set of video playback addresses that do not support the device type and browser type; and
   rejecting the selected video playback address if the selected video playback address is in the received blacklist.

5. The computer-implemented method of claim 1, wherein the method further comprises:
   during the online video playback, sending playback quality information to the server; and
   receiving from the server, an updated set of video playback addresses and corresponding configuration files generated based at least on the playback quality information, the device type, and the browser type.

6. A computer-implemented method for facilitating internet/online video playbacks on a user device, the method comprising:
   receiving an uploaded video;
   transcoding the uploaded video with multiple encoding schemes and resolutions to generate a set of transcoded videos of the uploaded video;
   for each video in the set of transcoded videos of the uploaded video, generating a corresponding video playback address for the transcoded video to specify the storage location of the transcoded video;
   receiving a video playback request from a user device for an online video, wherein the video playback request includes at least a device type and a browser type of the user device;
   generating a set of video playback addresses and a corresponding set of video playback configuration files of the requested video based at least on the device type and browser type; and
   sending the set of video playback addresses and the corresponding playback configuration files back to the user device to facilitate playing the requested online video on the user device.

7. The computer-implemented method of claim 6, wherein the video playback request further includes network status information, and wherein the set of video playback addresses and the set of video playback configuration files are generated based on the network status information, the device type, and the browser type.

8. The computer-implemented method of claim 6, wherein the method further comprises:
   generating a blacklist of video playback addresses that do not support the device type and/or the browser type; and
   sending the blacklist of video playback addresses back to the user device.

9. The computer-implemented method of claim 6, wherein the method further comprises:
   receiving video playback quality information from the user device during an online video playback;
   updating the set of generated video playback addresses and the corresponding configuration files based on the received playback quality information; and
   sending the updated set of video playback addresses and the corresponding configuration files back to the user device.

10. The computer-implemented method of claim 6, wherein transcoding the uploaded video with multiple encoding schemes and resolutions includes:
   transcoding the uploaded video into a first set of encoded videos corresponding to the multiple encoding schemes; and
   transcoding each encoded video in the first set of encoded videos into a second set of videos corresponding to multiple video resolutions.

11. The computer-implemented method of claim 6, wherein the multiple encoding schemes include: MPEG-1, MPEG-4, H.264, and WebM.

12. A client device for playing internet/online videos, comprising:
- one or more processors;
- a web browser;
- a transmitting module configured to send a video playback request for playing back an online video to a server, wherein the video playback request includes at least a device type of the client device and a browser type of the web browser;
- a receiving module configured to receive a set of video playback addresses and a set of video playback configuration files from the server, wherein the set of video playback addresses and the set of video playback configuration files are generated based at least on the device type and the browser type;
- a selection module configured to select a video playback address from the set of video playback addresses corresponding to a transcoded version of the online video that matches a device version and a browser version of the client device, wherein selecting the video playback address further includes:
  - if the client device supports WebAssembly, selecting a video playback address in the set of video playback addresses corresponding to a first copy of the online video which was transcoded based on a H.264 encoding format; and
  - if the client device does not support WebAssembly, selecting a video playback address in the set of video playback addresses corresponding to a second copy of the online video which was transcoded based on a MPEG-1 encoding format;
- an acquisition module configured to obtain the transcoded version of the online video from the selected video playback address; and
- a playback module configured to play back the obtained video on the client device using a corresponding video playback configuration file in the set of video playback configuration files,
- wherein the transmitting module of the client device is further configured to send playback quality information to the server during the online video playback on the client device.

13. The client device of claim 12,
- wherein the receiving module is further configured to receive a blacklist from the server, wherein the blacklist includes a second set of video playback addresses that do not support the device type and browser type; and
- wherein the selection module is further configured to reject the selected video playback address if the selected video playback address is in the received blacklist.

14. The client device of claim 12,
- wherein the receiving module is further configured to receive from the server, an updated set of video playback addresses and corresponding configuration files generated based at least on the playback quality information, the device type, and the browser type.

15. A server for facilitating internet/online video playbacks on a user device, comprising:
- one or more processors;
- a storage device coupled to the one or more processors;
- a receiving module configured to receive a video playback request from a user device for an online video, wherein the video playback request includes at least a device type and a browser type of the user device;
- a processing module configured to generate a set of video playback addresses and a corresponding set of video playback configuration files of the requested video based at least on the device type and browser type; and
- a transmitting module configured to send the set of video playback addresses and the corresponding playback configuration files back to the user device to facilitate playing the requested video on the user device,
- wherein the receiving module is further configured to receive an uploaded video from an owner of the uploaded video; and
- wherein the server further comprises a transcoding module which is configured to:
  - transcode the uploaded video with multiple encoding schemes and resolutions to generate a set of transcoded videos of the uploaded video; and
  - for each video in the set of transcoded videos of the uploaded video, generate a corresponding video playback address for the transcoded video to specify the storage location of the transcoded video.

16. The server of claim 15,
- wherein the processing module is further configured to generate a blacklist of video playback addresses that do not support the device type and/or the browser type; and
- wherein the transmitting module is further configured to send the blacklist of video playback addresses back to the user device.

17. The server of claim 15,
- wherein the receiving module is further configured to receive video playback quality information from the user device during an online video playback;
- wherein the processing module is further configured to update the set of generated video playback addresses and the corresponding configuration files based on the received playback quality information; and
- wherein the transmitting module is further configured to send the updated set of video playback addresses and the corresponding configuration files back to the user device.

18. The computer-implemented method of claim 6, wherein the requested online video is the uploaded video.

* * * * *